(No Model.)
T. R. CRANE.
DRILL TUBE.
No. 363,606. Patented May 24, 1887.
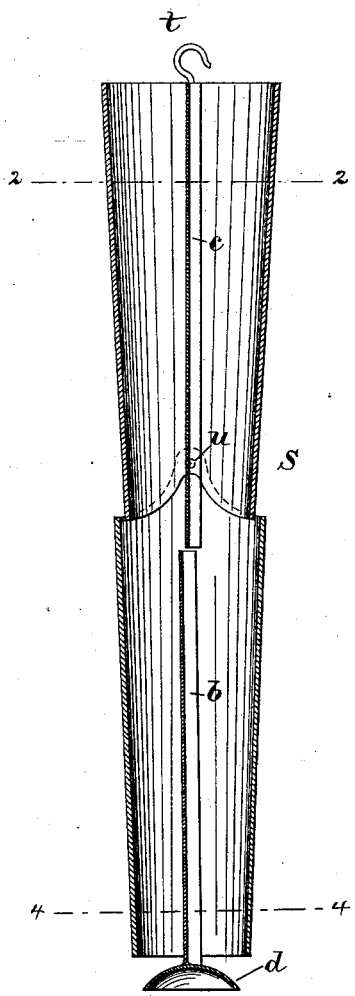
Fig. 1.
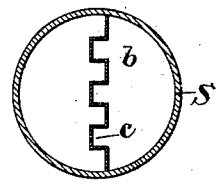
Fig. 2.
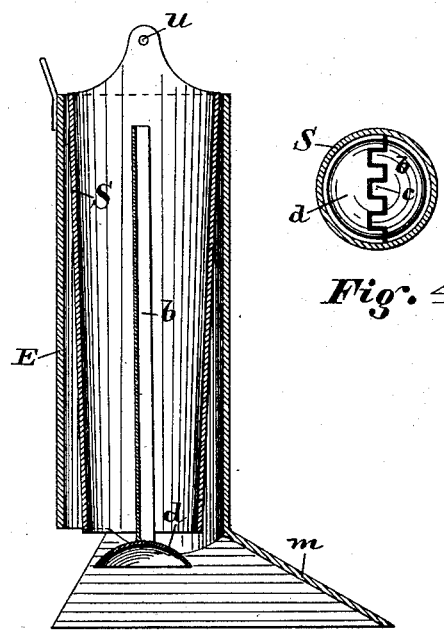
Fig. 3.
Fig. 4.
WITNESSES:
J. K. E. Diffenderffer.
Edward A. Osse,
INVENTOR:
Thos. R. Crane
BY Chas B. Mann
ATTORNEY.

UNITED STATES PATENT OFFICE.

THOMAS R. CRANE, OF HEATHSVILLE, VIRGINIA.

DRILL-TUBE.

SPECIFICATION forming part of Letters Patent No. 363,606, dated May 24, 1887.

Application filed March 28, 1887. Serial No. 232,656. (No model.)

*To all whom it may concern:*

Be it known that I, THOMAS R. CRANE, a citizen of the United States, residing at Heathsville, in the county of Northumberland and State of Virginia, have invented certain new and useful Improvements in Drill-Tubes, of which the following is a specification.

This invention relates to a conveyer-tube for grain-drills, and is illustrated in the accompanying drawings, in which—

Figure 1 is a sectional view of the improved conveyer-tube. Fig. 2 is a cross section of the tube on line 2 2. Fig. 3 is a vertical section of a drill-tube and one of the improved conveyer-tubes. Fig. 4 is a cross section of the conveyer-tube on line 4 4.

The letter E designates an ordinary drill-tube, such as are attached to grain and fertilizer drills. This tube has a shoe, $m$, which opens the furrow for the grain.

I have provided a jointed metal tube, S, to convey the grain or fertilizer from the hopper to the drill-tube. This jointed metal tube is a substitute for the ordinary rubber tubes heretofore used for the same purpose, and is a much superior article. I do not here claim, broadly, a conveyer-tube made in sections and jointed together, as this feature constitutes the subject-matter of my application for Letters Patent of the United States filed March 3, 1887, Serial No. 229,542.

The feature of novelty to which this application relates is the corrugated or grooved slideway $b$ in the tube. This slideway $b$ comprises a plate having two or more longitudinal grooves or gutters, $c$, and said plate is secured centrally within the tube, as shown. At the lower end of the slideway $b$ is a convex disk, $d$, placed with its convex side up. The diameter of this disk is less than the internal diameter of the lower end of the conveyer-tube.

The parts are arranged relatively to each other as follows: The drill-tube E is attached, as usual or in any desired way, to the machine, and the conveyer-tube S has a hook or eye, $t$, at its upper end for attachment below the hopper-bottom. The lower section of this tube extends down into the drill-tube E, and the two sections of tube are connected together by a hinged joint, $u$. The convex disk $d$ on the end of conveyer-tube has position in the uppermost part of the shoe $m$. Ordinarily the tubes as attached to the machine would be slightly inclined.

From this description it will be seen that when grain or seed of any kind is discharged from the hopper of a drill it will pass down the grooves or gutters $c$ of the slideway $b$ and strike on the convex disk $d$, by which it will be scattered or spread below the shoe in the open furrow. I may use the improved slideway $b$ without the disk, as its use secures improved results.

This device produces a drill-tube which is especially adapted for accurately and evenly drilling grain on hillsides. Ordinary drill-tubes at work on hillsides will not scatter and spread the grain. Should they even be provided with a disk-spreader similar to the one here shown they will not accomplish the desired result, because when the drill-tube has a laterally-inclined position, as on hillsides, all of the grain will fall on the lowest side of the tube. The corrugated or grooved slideway $b$ in the tube obviates this difficulty and secures a uniform planting of the grain on hilly or uneven ground.

This improved slideway may be used in metal, rubber, or leather tube and in tubes without joints.

Having described my invention, I claim and desire to secure by Letters Patent of the United States—

1. In a grain-drill, a conveyer-tube having a slideway-plate provided with longitudinal grooves or gutters $c$, and secured centrally within the tube, for the purpose set forth.

2. In a grain-drill, the combination, with the drill-tube E, of a conveyer-tube, S, provided with an internal corrugated or grooved slideway, as set forth.

In testimony whereof I affix my signature in the presence of two witnesses.

THOMAS R. CRANE.

Witnesses:
 JOHN E. MORRIS,
 JNO. T. MADDOX.